(12) United States Patent
Angell et al.

(10) Patent No.: US 11,502,594 B2
(45) Date of Patent: Nov. 15, 2022

(54) SWITCHED-MODE POWER CONVERTER WITH RIPPLE ATTENUATION

(71) Applicant: Analog Devices International Unlimited Company, Limerick (IE)

(72) Inventors: Michael Gregory Angell, Colorado Springs, CO (US); Eric A. Sagen, Colorado Springs, CO (US)

(73) Assignee: Analog Devices International Unlimited Company, Limerick (IE)

( * ) Notice: Subject to any disclaimer, the term of this patent is extended or adjusted under 35 U.S.C. 154(b) by 88 days.

(21) Appl. No.: 16/878,368

(22) Filed: May 19, 2020

(65) Prior Publication Data

US 2021/0367504 A1    Nov. 25, 2021

(51) Int. Cl.
| | | |
|---|---|---|
| *H02M 1/14* | (2006.01) | |
| *H02M 3/158* | (2006.01) | |
| *H02M 1/00* | (2006.01) | |

(52) U.S. Cl.
CPC ............ *H02M 1/14* (2013.01); *H02M 3/158* (2013.01); *H02M 1/0009* (2021.05)

(58) Field of Classification Search
CPC ............ H02M 1/0003; H02M 1/0009; H02M 1/0048; H02M 1/0067; H02M 1/0077; H02M 1/0083; H02M 1/0095; H02M 1/14; H02M 1/143; H02M 3/156; H02M 3/158; H02M 3/1582; H02M 3/1584
See application file for complete search history.

(56) References Cited

U.S. PATENT DOCUMENTS

| | | |
|---|---|---|
| 6,462,520 B1 | 10/2002 | Mangtani et al. |
| 6,836,103 B2 | 12/2004 | Brooks et al. |
| 7,872,886 B2 | 1/2011 | Xu et al. |
| 8,698,475 B2 | 4/2014 | Dong et al. |
| 8,842,450 B2 | 9/2014 | Jungreis et al. |
| 8,981,848 B2 | 3/2015 | Kay et al. |
| 9,086,708 B2 | 7/2015 | Tournatory et al. |
| 9,559,591 B2 | 1/2017 | Hang et al. |
| 9,577,532 B2 | 2/2017 | Tournatory et al. |
| 9,831,781 B2 | 11/2017 | Zhang et al. |
| 10,015,849 B2 | 7/2018 | Liu |

(Continued)

FOREIGN PATENT DOCUMENTS

KR    101715673 B1    3/2017

OTHER PUBLICATIONS

Chu, Li-Cheng, et al., "A Pseudo-Ramp Controlled Three Level Buck Converter with an Auto-ripple Cancellation Technique for Low Output Voltage Ripple in Sub-threshold Applications", IEEE 44th European Solid State Circuits Conference (ESSCIRC), (2018), 4 pgs.

(Continued)

*Primary Examiner* — Jue Zhang
(74) *Attorney, Agent, or Firm* — Schwegman Lundberg & Woessner, P.A.

(57) ABSTRACT

A switched-mode power converter apparatus includes a switching converter to receive an input voltage, to convert the input voltage to an output voltage, and to transmit the output voltage to an output node. The apparatus also includes a ripple attenuation circuit coupled to the output node and a voltage source. The voltage source is adjusted to generate a ripple attenuation signal by the ripple attenuation circuit at the output node.

21 Claims, 9 Drawing Sheets

(56) References Cited

U.S. PATENT DOCUMENTS

| | | | |
|---|---|---|---|
| 10,224,805 B1* | 3/2019 | Young | H02M 3/1582 |
| 10,298,114 B1* | 5/2019 | Yazdi | H02M 3/158 |
| 10,454,373 B2 | 10/2019 | Gurlahosur | |
| 2008/0205095 A1 | 8/2008 | Pinon et al. | |
| 2013/0099761 A1* | 4/2013 | Dong | H02M 3/156 |
| | | | 323/271 |
| 2013/0106378 A1* | 5/2013 | Khlat | H02M 1/15 |
| | | | 323/282 |
| 2013/0141072 A1* | 6/2013 | Khlat | H02M 3/155 |
| | | | 323/304 |
| 2014/0252973 A1* | 9/2014 | Liu | H02M 1/08 |
| | | | 315/200 R |
| 2015/0061632 A1* | 3/2015 | Philbrick | H02M 3/158 |
| | | | 323/290 |
| 2016/0248328 A1* | 8/2016 | Zhang | H02M 3/1584 |
| 2017/0019017 A1* | 1/2017 | Hawley | H02M 1/143 |
| 2017/0207723 A1* | 7/2017 | Zhang | H02M 3/1584 |
| 2018/0248472 A1* | 8/2018 | Qiu | H05B 45/355 |
| 2019/0074770 A1 | 3/2019 | Trichy et al. | |
| 2019/0109533 A1 | 4/2019 | Horst | |

OTHER PUBLICATIONS

Lu, Yan, et al., "A Multiphase Switched-Capacitor DC-DC Converter Ring With Fast Transient Response and Small Ripple", IEEE Journal of Solid-State Circuits, 52(2), (Feb. 2017), 579-591.

* cited by examiner

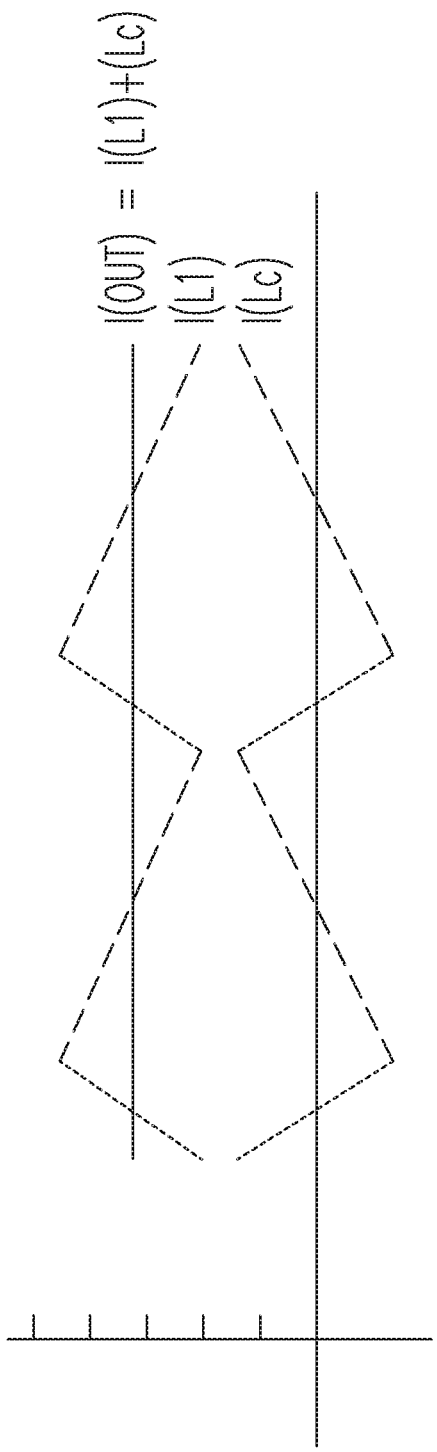

SWITCHED-MODE POWER CONVERTER WITH RIPPLE ATTENUATION

TECHNICAL FIELD

The present disclosure generally relates to switched-mode power converters for converting input voltages to different voltage levels and techniques to reduce or attenuate ripples associated with the converted voltages.

BACKGROUND

Switched-mode power converters are used to increase (e.g., boost converter) or decrease (e.g., buck converter) an input voltage from a power source to a desired voltage suitable for connected load devices. For example, switched-mode power converters can include, among other things, two switches that alternatively turn on and off to generate an output voltage at the desired voltage level. This switching, however, can cause undesirable effects such as producing a ripple in the output voltage. A ripple refers to when the output voltage rises and fans like a waveform, instead of maintaining at a steady level.

Some techniques, such as using an additional filter at the output, to reduce ripples can suffer from numerous drawbacks. For example, a filter can include a large inductor and a large capacitor; these additional components add expense and size to the device. Moreover, the filter can introduce conduction losses and delay due to the current flowing through the extra inductor.

BRIEF DESCRIPTION OF THE DRAWINGS

Various ones of the appended drawings merely illustrate example embodiments of the present disclosure and should not be considered as limiting its scope.

FIG. 1(C) illustrates current waveforms associated with a switch-mode power converter system with ripple attenuation.

DETAILED DESCRIPTION

This document describes a switched-mode power converter apparatus with ripple attenuation. The apparatus includes a switching converter to receive an input voltage, to convert the input voltage to an output voltage, and to transmit the output voltage to an output node. The apparatus also includes a ripple attenuation circuit coupled to the output node and a voltage source. The voltage source is adjusted to generate a ripple attenuation signal by the ripple attenuation circuit at the output node.

This document also describes a method, which includes converting an input voltage to an output voltage using a switching converter; adjusting a voltage source to generate a ripple attenuating signal using a ripple attenuation circuit; and adding the ripple attenuating signal to the output voltage.

This document also describes a ripple attenuation circuit. The circuit includes a first switching device coupled to a configurable voltage source and an output node via an inductor, wherein the output node is coupled to a switching converter. The circuit also includes a second switching device coupled to the output node via the inductor. Based on a ripple in an output voltage of the switching converter at the output node, the configurable voltage source is adjusted to generate a ripple attenuating signal at the output node.

Figure 1A:
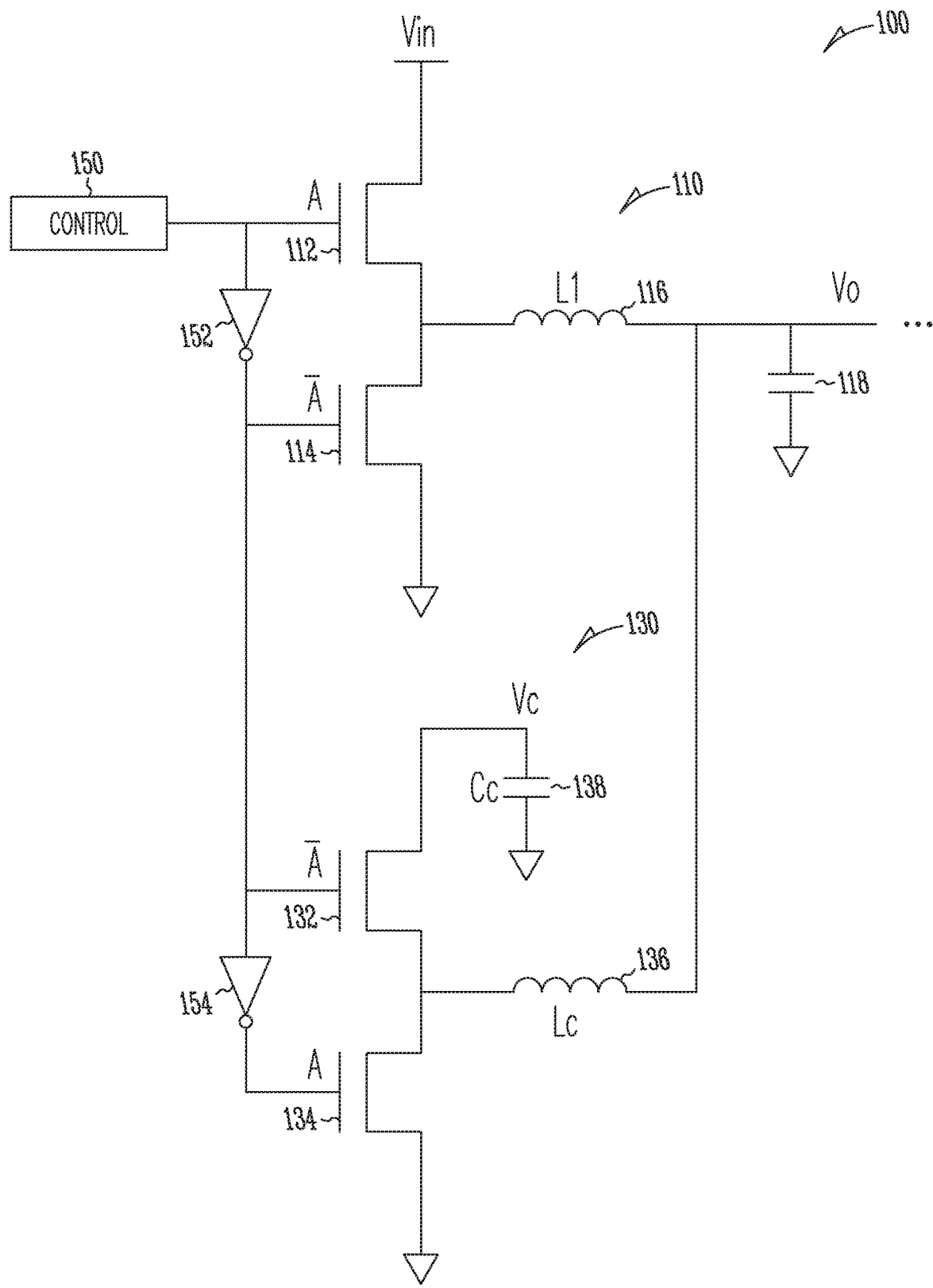
FIG. 1(A) illustrates a switch-mode power converter system with ripple attenuation.

FIG. 1(A) illustrates an example of portions of a switch-mode power converter system 100 with ripple attenuation. The switch-mode power converter system 100 may include a switching converter 110, a ripple attenuation circuit 130, and a control circuit 150. The switching converter 110 may receive an input voltage $V_{IN}$, which has a first voltage level. The switching converter 110 may then convert $V_{IN}$ to an output voltage $V_O$, which has a second voltage level. The switching converter 110 may include a pair of switching devices 112, 114, an inductor L1 116, and a capacitor 118. The switching devices 112, 114 may be provided as N channel field-effect transistors ("FETs"), as P channel. FETE, a metal-oxide-semiconductor YET (MOSFET), or a combination, or the like.

Input voltage $V_{IN}$ may be applied to an input terminal of the switching device 112. $V_{IN}$ may be a voltage at the first voltage level. The output of switching device 112 may be coupled to the inductor L1 116 and the switching device 114, which may also be coupled to ground. The inductor L1 116 may be coupled to the capacitor 118, defining an output node for the output voltage $V_O$.

The timing of the switching devices 112, 114 may be controlled by the control circuit 150 and an inverter 152. The control circuit 150 with the inverter 152 may alternately turn on and off the switching devices 112, 114. For example, the control circuit 150 may output a pulse width modulation signal to control when the switching device 112 turns on and off. The inverter 152 may invert that pulse width modulation signal so that the switching device 114 is turned on and off at opposite times as switching device 112. In other words, when the switching device 112 is on, the switching device 114 is off and vice versa. The rapid on and off duty cycles of switching devices 112, 114 may be used to control the value of $V_O$. The switching devices 112, 114 may be provided as a complementary pair of transistor devices, for example the switching device 112 may be provided as a P channel FET while the switching device 114 may be provided as a N channel. FET, in which case the control circuit 150 may not need to use the inverter 152 to alternate the timing of the switching devices.

The ripple attenuation circuit 130 may be coupled to the output node where $V_O$ is generated by the switching converter 110. The ripple attenuation 130 circuit may generate a ripple attenuation signal, which is added to $V_O$ at the output node. The ripple attenuation circuit 130 may include a pair of switching devices 132, 134, an inductor $L_C$ 136, and a capacitor $C_C$ 138. The switching devices 132, 134 may be provided as N channel. FETs, as P channel FETs, MOSFETs, or a combination, or the like. For example, the switching devices 132, 134 may be provided as the same type as the switching devices 112, 114 of the switching converter 110, but may be smaller than the switching devices 112, 114.

The capacitor $C_C$ 138 may be coupled to the switching device 132. The voltage at the capacitor $C_C$ 138 may be unregulated. The switch timings may generate an adjustable voltage $V_C$ at the input terminal of the switching device 132. The output of switching device 132 may be coupled to the inductor $L_C$ 136 and the switching device 134, which may also be coupled to ground. The inductor $L_C$ 136 may be coupled to the output node where the output voltage $V_O$ is generated.

The timing of the switching devices 132, 134 may be controlled by the control circuit 150 and inverters 152, 154. The control circuit 150 with inverter 152, 154 may alternately turn on an off the switching devices 132, 134. The switching devices 132, 134 may be activated opposite as that of the switching devices 112, 114. In an example, the switching devices 132, 134 may be provided as a complementary pair of transistor devices, for example the switching device 132 may be provided as a P channel FET while the switching device 134 may be provided as a N channel FET.

Figure 1B:
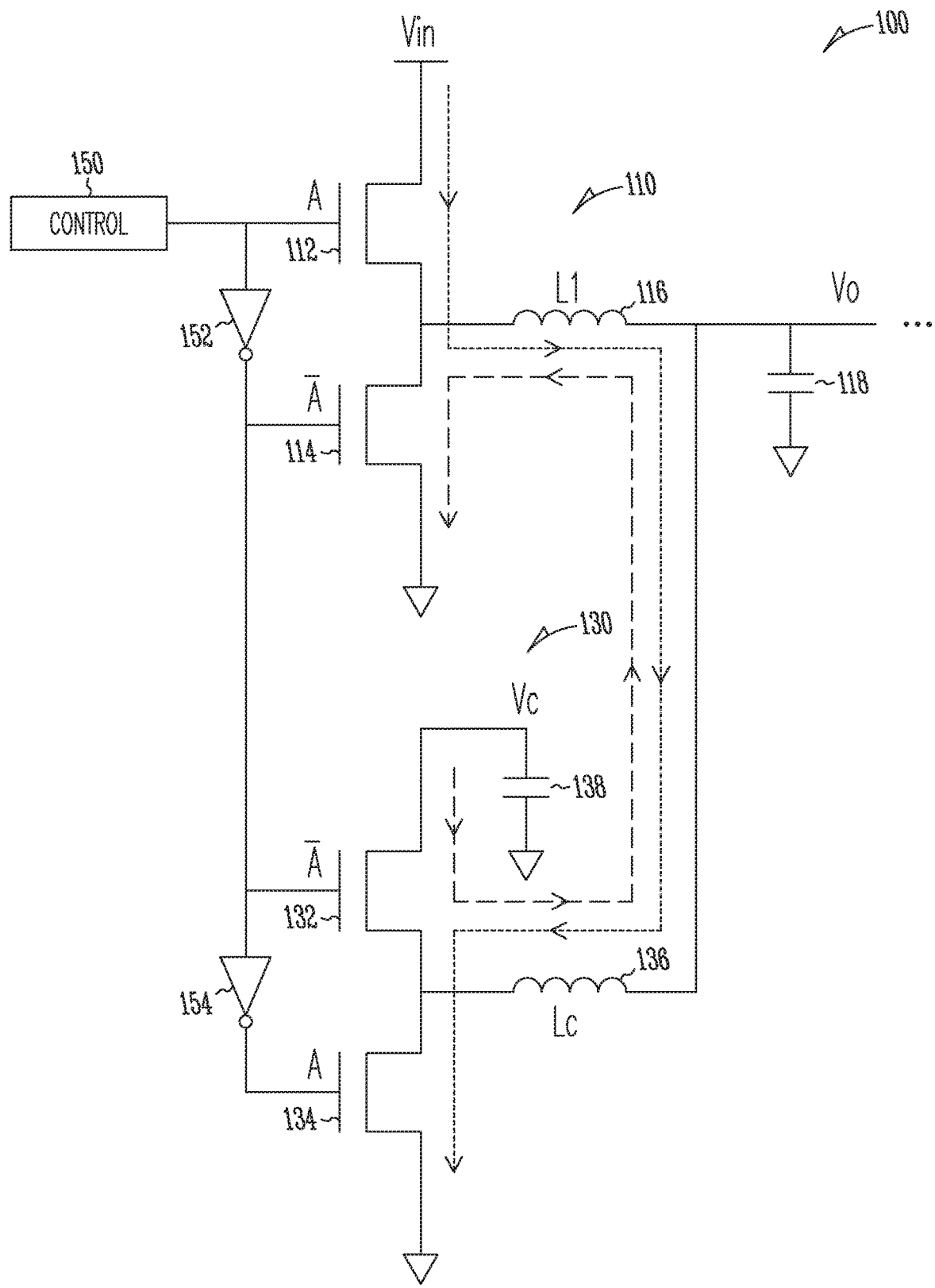
FIG. 1(B) illustrates a switch-mode power converter system with ripple attenuation.

Next, the operation of the switch-mode power converter system 100 is described with reference to FIGS. 1(B) and 1(C), which show a flow of a current I(L1) flowing through inductor L1 116, a current I($L_C$) flowing through inductor $L_C$ 136, and an output current I(Out), which is the sum of I(L1) and I($L_C$). For example, an inductance value of inductor $L_C$ 136 may be chosen to be:

$$LC = L1 * \frac{VO}{(VIN - VO)},$$

where L1 is an inductance value of inductor L1 116, $V_O$ is the output voltage, and TIN is the input voltage.

The voltage $V_C$ may act as an adjustable boost voltage to the output node, and therefore the voltage $V_C$ may settle to a value where the average current I($L_C$) through inductor $L_C$ 136 is zero. Alternating current (AC) between the switching converter 110 and the ripple attenuation circuit 130 may cancel out, leading to a more stable I(Out). Hence, ripple(s) in the output voltage $V_O$ may be reduced or attenuated (or even cancelled) by the ripple attenuation signal generated by the ripple attenuation circuit 130.

Figure 2:
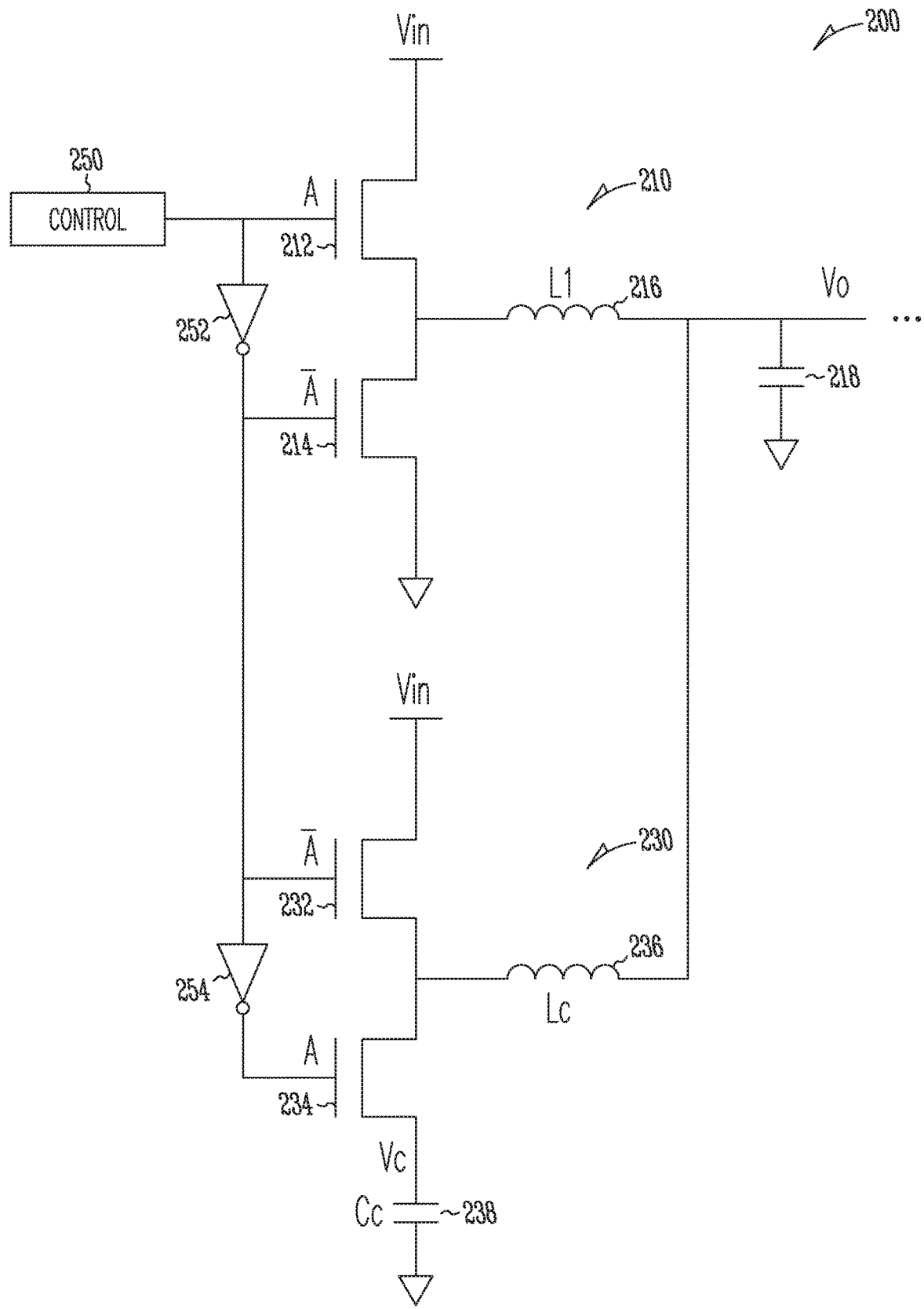
FIG. 2 illustrates a switch-mode power converter system ripple attenuation.

FIG. 2 illustrates an example of portions of a switch-mode power converter system 200 with ripple attenuation. The switch-mode power converter system 200 may include a switching converter 210, a ripple attenuation circuit 230, and a control circuit 250. The switching converter 210 may receive an input voltage $V_{IN}$, which has a first voltage level. The switching converter 210 may then convert $V_{IN}$ to an output voltage $V_O$, which has a second voltage level. The switching converter 210 may include a pair of switching devices 212, 214, an inductor L1 216, and a capacitor 218. The switching devices 212, 214 may be provided as N channel FETs, as P channel FETs, MOSFETs, or a combination, or the like.

Input voltage $V_{IN}$ may be applied to an input terminal of the switching device 212. $V_{IN}$ may be a voltage at the first voltage level. The output of switching device 212 may be coupled to the inductor L1 216 and the switching device 214, which may also be coupled to ground. The inductor L1 216 may be coupled to the capacitor 218, defining an output node for the output voltage $V_O$.

The timing of the switching devices 212, 214 may be controlled by the control circuit 250 and an inverter 252. The control circuit 250 with the inverter 252 may alternately turn on and off the switching devices 212, 214. For example, the control circuit 250 may output a pulse width modulation signal to control when the switching device 212 turns on and off. The inverter 252 may invert that pulse width modulation signal so that the switching device 214 is turned on and off at opposite times as switching device 212. In other words, when the switching device 212 is on, the switching device 214 is off and vice versa. The rapid on/off duty cycles of switching devices 212, 214 may be used to control the value of $V_O$. In an example, the switching devices 212, 214 may be provided as a complementary pair of transistor devices, for example the switching device 212 may be provided as a P channel FET while the switching device 214 may be provided as a N channel FET, in which case the control circuit 250 may not use the inverter 252 to alternate the timing of the switching devices.

The ripple attenuation circuit 230 may be coupled to the output node where $V_O$ is generated by the switching converter 210. The ripple attenuation 230 circuit may generate a ripple attenuation signal, which is added to $V_O$ at the output node. The ripple attenuation circuit 130 may include a pair of switching devices 232, 234, an inductor $L_C$ 236, and a capacitor $C_C$ 238. The switching devices 232, 234 may be provided as N channel FETs, as P channel FETs, MOSFETs, or combination, or the like. For example, the switching devices 232, 234 may be provided as the same type as the switching devices 212, 214 of the switching converter 210, but may be smaller than the switching devices 212, 214.

Input voltage $V_{IN}$ may be coupled to the switching device 232. The output of switching device 232 may be coupled to the inductor $L_C$ 236 and the switching device 234. The switching device 234 may also be coupled to the capacitor $C_C$ 238. The switch timings may generate an adjustable voltage $V_C$, at the terminal of the switching device 234. The inductor $L_C$ 236 may be coupled to the output node where the output voltage $V_O$ is generated.

The timing of the switching devices 232, 234 may be controlled by the control circuit 250 and inverters 252, 254. The control circuit 250 with inverter 252, 254 may alternately turn on an off the switching devices 232, 234. The switching devices 232, 234 may be activated opposite as that of the switching devices 212, 214. In an example, the switching devices 232, 234 may be provided as a complementary pair of transistor devices, for example the switching device 232 may be provided as a P channel YET while the switching device 234 may be provided as a N channel FET.

An inductance value of inductor $L_C$ 236 may be chosen to be:

$$LC = L1 * \frac{(VIN - VO)}{VO},$$

where L1 is an inductance value of inductor L1 216, $V_O$ is the output voltage, and $V_{IN}$ is the input voltage.

The voltage $V_C$ may settle to a value where the average current I($L_C$) through inductor $L_C$ 236 is zero. Alternating current (AC) between the switching converter 210 and the ripple attenuation circuit 230 may cancel out, leading to a more stable output current. Hence, ripple(s) in the output voltage $V_O$ may be reduced or attenuated (or even cancelled) by the ripple attenuation signal generated by the ripple attenuation circuit 230.

The ripple attenuation circuit 130 (of FIG. 1(A)) and the ripple attenuation circuit 230 (of FIG. 2) provide ripple attenuation with different configurations, as described above, and the different configurations may provide different benefits in different applications. For example, when the duty cycle is less than 50%, the configuration of the ripple attenuation circuit 130 (of FIG. 1(A)) may provide better control, such as manageable ranges for voltages and inductance values. On the other hand, when the duty cycle is greater than 50%, the configuration of the ripple attenuation circuit 230 (of FIG. 2) may provide better control, such as manageable ranges for voltages and inductance values.

As described above, the switch timing of the attenuation circuits may be synchronized with the switch timing of the coupled switching converters, e.g., the switching timing of the attenuation circuit was opposite of the switching timing of the switching converter. This dependence of the switch timing may lead to the attenuation circuit absorbing the switching converter's response to load transients. Therefore, the switching timing of the attenuation circuit may be de-coupled from the switch timing of the switching converters. In other words, the timing of the switching devices in the attenuation circuit may be independent of the timing of the switching devices in the coupled switching converter (i.e., unsynchronized). The timing of the switching devices in the attenuation circuit may be based on a magnitude of the output voltage and/or a rate of change of the output voltage. The control circuit may desynchronize the timing of the switching devices of the attenuation circuit during transient conditions and may eventually lock the switching devices in the attenuation circuit to the opposite of the switching devices of the switching converter in a steady state. Example embodiments of desynchronization techniques are described in further detail below with reference to FIG. 6.

Figure 3:
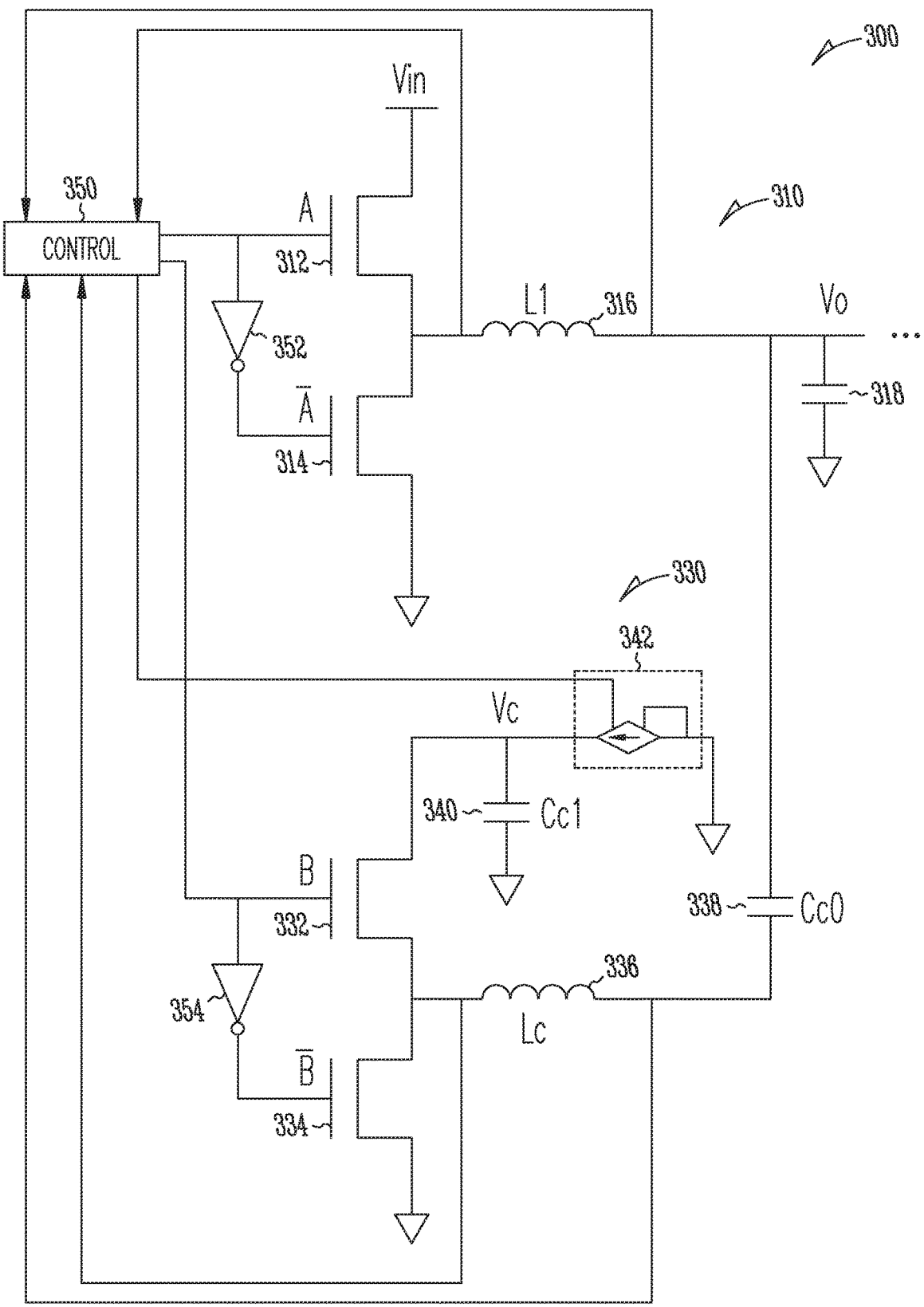
FIG. 3 illustrates a switch-mode power converter system with ripple attenuation.

FIG. 3 illustrates an example of portions of a switch-mode power converter system 300 with ripple attenuation. The switch-mode power converter system 300 may include a switching converter 310, a ripple attenuation circuit 330, and a control circuit 350. The switch-mode power converter system 300 may provide active ripple detection. For example, the control circuit 350 may include a ripple detector, as described below. The ripple detector may be integrated with the control circuit 350 or may be provided separate of the control circuit 350.

The switching converter 310 may receive an input voltage $V_{IN}$, which has a first voltage level. The switching converter 310 may then convert $V_{IN}$ to an output voltage $V_O$, which has a second voltage level. The switching converter 310 may include a pair of switching devices 312, 314, an inductor L1 316, and a capacitor 318. The switching devices 312, 314 may be provided as N FETs, as P channel FETs, MOSFETs, or a combination or the like.

Input voltage $V_{IN}$ may be applied to an input terminal of the switching device 312. $V_{IN}$ may be a voltage at the first voltage level. The output of switching device 312 may be coupled to the inductor L1 316 and the switching device 314, which may also be coupled to ground. The inductor L1 316 may be coupled to the capacitor 318, defining an output node for the output voltage $V_O$.

The timing of the switching devices 312, 314 may be controlled by the control circuit 350 and an inverter 352. The control circuit 350 with the inverter 352 may alternately turn on an off the switching devices 312, 314 by generating a first control signal. For example, the control circuit 350 may output a pulse width modulation signal to control when the switching device 312 turns on and off. The inverter 252 may invert that pulse width modulation signal so that the switching device 314 is turned on and off in opposite times as switching device 312. In other words, when the switching device 312 is on, the switching device 314 is off and vice versa. The rapid on/off duty cycles of switching devices 312, 314 may be used to control the value of $V_O$. The switching devices 312, 314 may be provided as a complementary pair of transistor devices, for example the switching device 312 may be provided as a P channel FET while the switching device 314 may be provided as a N channel FET, in which case the control circuit 350 may not use the inverter 352 to alternate the timing of the switching devices.

The ripple attenuation circuit 330 may be coupled to the output node where $V_O$ is generated by the switching converter 310. The ripple attenuation 330 circuit may generate a ripple attenuation signal, which is added to $V_O$ at the output node. The ripple attenuation circuit 330 may include a pair of switching devices 332, 334, an inductor $L_C$ 336, a capacitor $C_{C0}$ 338, a capacitor $C_{C1}$ 340, and a configurable source 342. The configurable source may be provided as a configurable current source, a voltage source, or the like. The switching devices 332, 334 may be provided as N channel FETs, as P channel FETs, MOSFETs, or a combination, or the like. The switching devices 332, 334 may be provided as the same type as the switching devices 312, 314 of the switching converter 310, but may be smaller than the switching devices 312, 314.

The configurable source 342 may be coupled to the capacitor $C_{C1}$ 340 and to the switching device 332, generating a controllable voltage $V_C$ at the input terminal of the switching device 332. The output of switching device 332 may be coupled to the inductor $L_C$ 336 and the switching device 334, which may also be coupled to ground. The inductor $L_C$ 336 may be coupled to capacitor $C_{C0}$ 338, which is in turn coupled to the output node where the output voltage $V_O$ is generated. An inductance value of inductor $L_C$ 336 may be chosen to be:

$$LC = \frac{L1}{2},$$

where L1 is an inductance value of inductor L1 316. This may lead to $V_C$ approaching $V_{IN}/2$.

Here, the ripple detector, in the control circuit 350, may measure the currents flowing through inductor L1 316 and inductor $L_C$ 336. Based on the measured the currents, the ripple detector may determine the presence and magnitude of the ripple in the output voltage, for example as described below with reference to FIG. 5. The control circuit 350, accordingly, may adjust the configurable source 342 to increase or decrease $V_C$ based on the detected ripple, for example by transmitting a second control signal. The control circuit 350 may also adjust the timing of the switching devices 332, 334 to account for transient loads. The control circuit 350, for example, may transmit a third control signal to control the timing of the switching devices 332, 334 using the inverter 354. In this example, the control circuit 350 may control the timing of the switching devices 332, 334 independently of the timing of the switching devices of 312, 314 (i.e., unsynchronized timing). The control circuit 350 may control the timing of the switching devices 332, 334 in the attenuation circuit 330 based on a magnitude of the output voltage and/or a rate of change of the output voltage as detected by the ripple detector.

Figure 4:
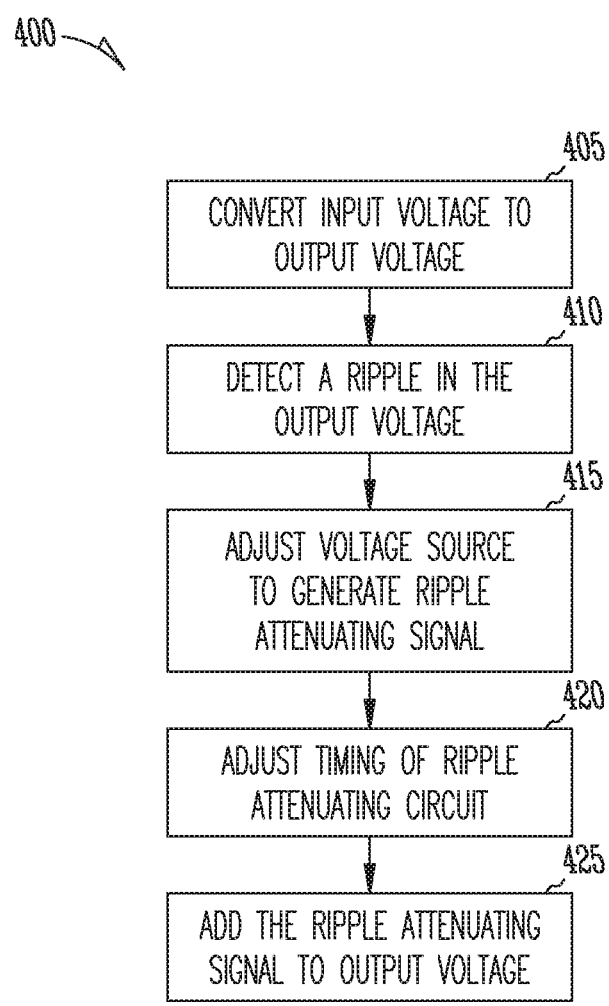
FIG. 4 is a flow diagram for detecting and attenuating a ripple.

FIG. 4 illustrates a flow diagram of an example of portions of a method 400 for detecting and attenuating a ripple. The method 400 may be executed by the switch-mode power converter system 300. At 405, an input voltage at a first voltage level may be converted to an output voltage at a second voltage level. At 410, a ripple in the output voltage may be detected. For example, the ripple may be detected by monitoring the output voltage directly or indirectly. The ripple may be detected using a variety of methods and techniques.

Figure 5:
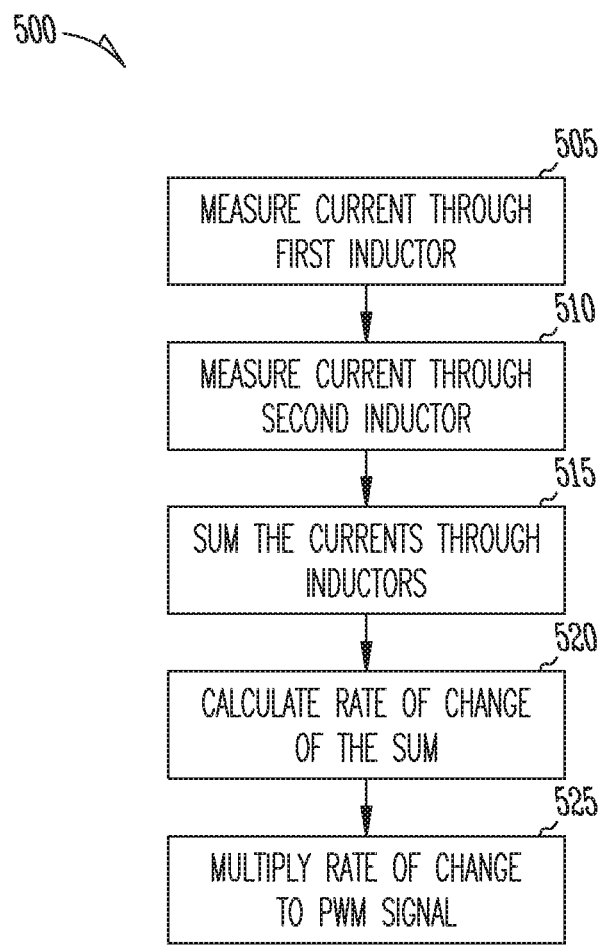
FIG. 5 is a flow diagram for detecting a ripple in an output voltage.

FIG. 5 illustrates a flow diagram of an example of a method 500 for detecting a ripple in an output voltage. At 505, a first current may be measured though a first inductor in a switching converter (e.g., inductor L1 316). At 510, a second current may be measured through a second inductor in a ripple attenuating circuit (e.g., inductor $L_C$ 336). At 515, the first and second currents may be summed. At 520, a rate of change of the sum of the currents may be calculated. For example, a derivative of the sum may be calculated. At 525, the rate of change may be multiplied to a pulse width modulation signal, which controls the timing of the switching converter. The result may indicate the presence and/or magnitude of the ripple.

Returning to FIG. 4, at 415, a ripple attenuating signal may be generated by, for example, adjusting a voltage source (e.g., $V_C$) based on the detected ripple. At 420, the timing of the ripple attenuating circuit may also be adjusted based on the detected ripple. For example, the timing may be adjusted based on magnitude of the output voltage and/or a rate of change of the output voltage. At 425, the ripple attenuating signal may be added to the output voltage to attenuate (or cancel) the detected ripple.

Figure 6:
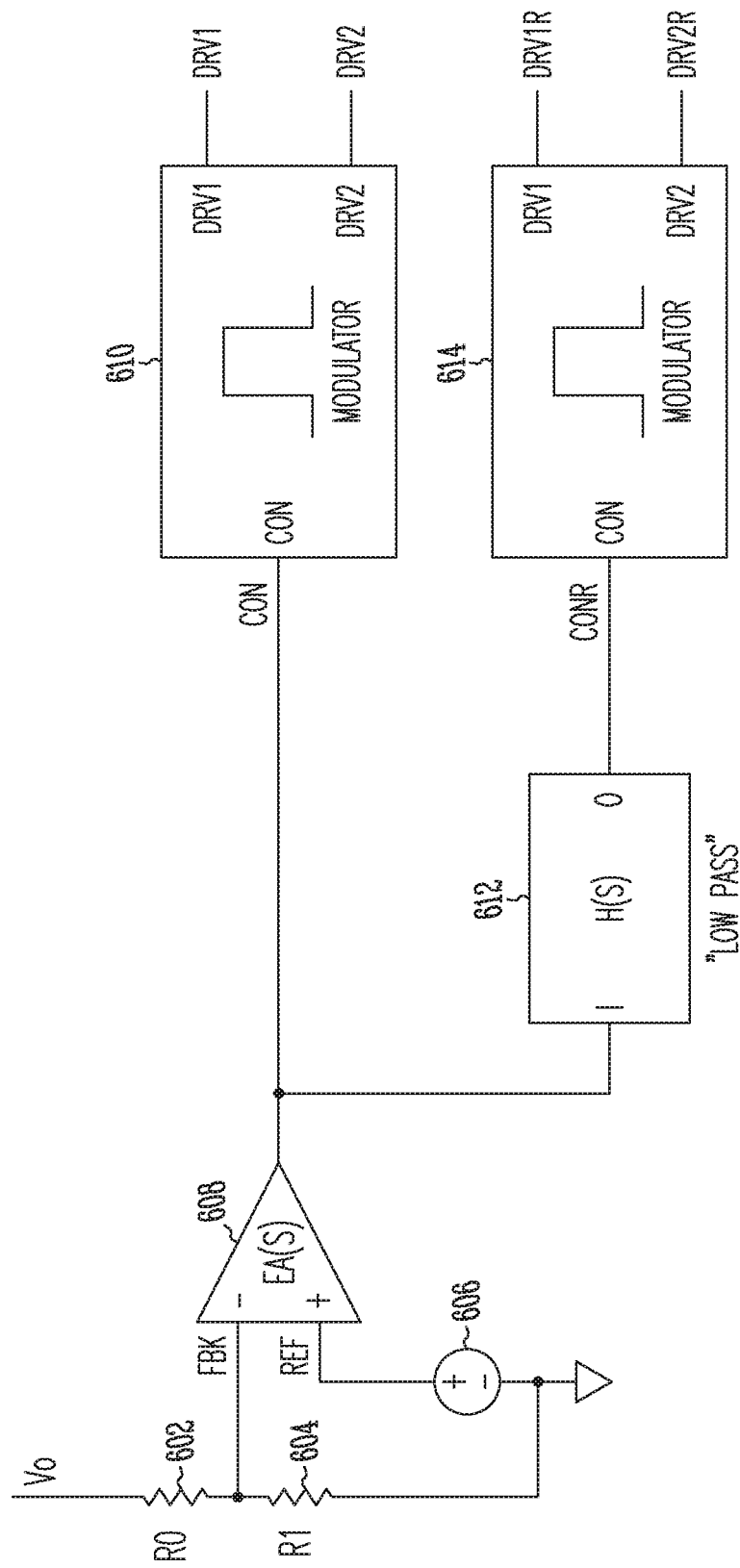
FIG. 6 illustrates a control circuit to control timings of a switch-mode power converter system.

FIG. 6 illustrates a control circuit to desynchronize timing of a switch converter and a ripple attenuation circuit in a switch-mode power converter system (e.g., as described above with reference to FIG. 3). Here, the control circuit may control the switch converter with a more responsive set of control signals (e.g., faster) to absorb transient moments while the ripple attenuation circuit may be less responsive (e.g., slower) and be maintained at or near steady-state levels during those transient moments. In other words, the switching converter may react faster to transient loads, and the ripple attenuation circuit may react slower to transient loads.

The control circuit may include a pair of resistors 602, 604, a reference voltage source 606, an error amplifier 608, a first modulator 610, a low pass filter 612, and a second modulator 614. The control circuit may receive an output voltage Vo of the switch-mode power converter system as an input at resistor 602. The reference voltage source 606 may generate a reference voltage (REF), and that reference voltage may be coupled to an input of the error amplifier 608. The voltage between the resistors 602, 604 (FBK), which is representative of the output voltage Vo, may be coupled to the other input of the error amplifier 608. Modulator 610 may be coupled to the output of the error amplifier 608 and may generate a first set of control signals DRV1 and DRV2, which may be coupled to a pair of switching devices (e.g., 312, 314) in the switching converter. The output of the error amplifier 606 may also be coupled to the low pass filter 612 and the second modulator 610 to generate second set of control signals DRV1R, and DRV2R, which may be coupled to a pair of switching devices (e.g., 332, 334) of the ripple attenuation circuit. In an embodiment, the timing of the switching converter (e.g., first set of control signals) may be responsive to the output voltage Vo, while the timing of the ripple attenuation circuit (e.g., second set of control signals) may be responsive to a comparison of the timings of the switching converter.

During steady state conditions, the first and second sets of control signals may be synchronized. However, during transient conditions, the duty cycles of first set of control signals (for the switching converter) may change responsive to detected transient conditions, while the duty cycles of the second state of control signals (for the ripple attenuation circuit) may be maintained at or near their steady state level. Thus, the timing of the switching converter and the ripple attenuation circuit may be desynchronized.

Figure 7:
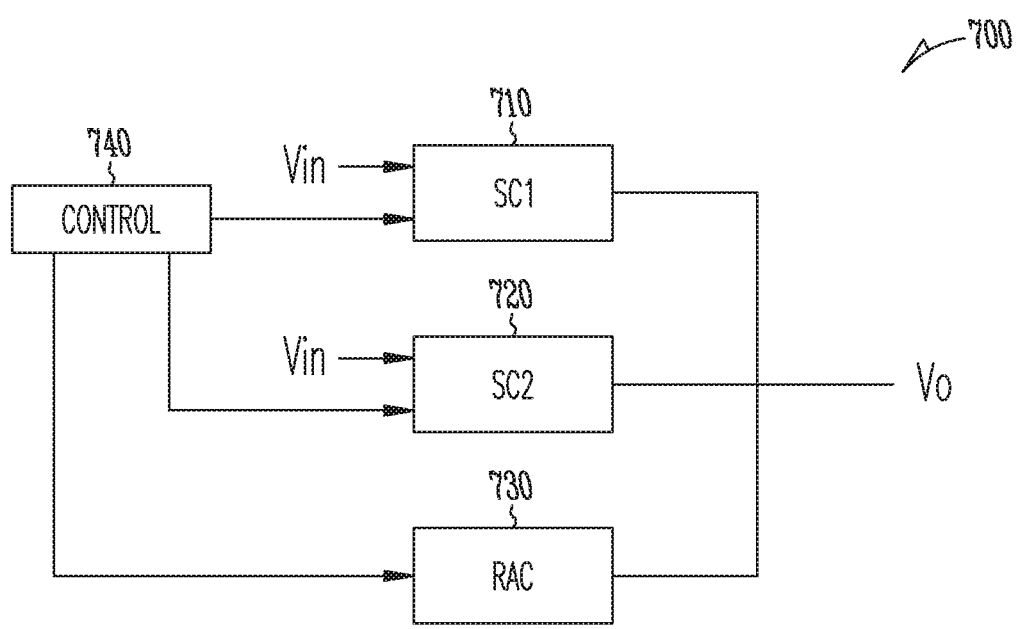
FIG. 7 illustrates a multi-phase switch-mode power converter with ripple attenuation.

Moreover, the above-described ripple attenuating techniques may also be used in multi-phase systems. FIG. 7 illustrates a multi-phase switch-mode power converter system 700 with ripple attenuation. The multi-phase switch-mode power converter system 700 may include two or more switching converters (SC1, SC2) 710, 720, one or more ripple attenuating circuit (RAC) 730, and a control circuit 740. The switching converters 710, 720 may be provided in the same or similar configuration as the switching converters described herein (e.g., switching converters 110, 210, 310). The RAC 720 may be provided in the same or similar configuration as the ripple attenuating circuits described herein (e.g., ripple attenuating circuits, 130, 230, 330). The control circuit 740 may control the operations of the switching converters 710, 720 and RAC 730 as described herein.

The switching converters 710, 720 may each convert an input voltage $V_{IN}$ in different phases and their outputs may be combined to generate an output voltage $V_O$. In FIG. 7, two switching converters are depicted for illustration purposes only; more than two switching converters may be provided.

The RAC 730 may generate a ripple attenuating signal such as described herein. The ripple attenuating signal may be combined with the output voltage $V_O$ to reduce or attenuate the ripple in the output voltage. Here, the switching converters 710, 720 share the RAC 730. That is, the RAC 730 may generate a ripple attenuating signal for the combined output voltage of the switching converters 710, 720. The RAC 730 may be shared by two or more switching converters. Alternatively, a separate RAC may be provided for each switching converter in a multi-phase switch-mode power converter system.

Several embodiments of the invention are specifically illustrated and/or described herein. However, it wall be appreciated that modifications and variations of the invention are covered by the above teachings and within the purview of the appended claims without departing from the intended scope of the invention.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A switched-mode power converter apparatus with ripple attenuation, the apparatus comprising:
   a switching converter to receive an input voltage, to convert the input voltage to an output voltage, and to transmit the output voltage to an output node, wherein the switching converter comprises a first pair of switching devices and a first inductor;

a ripple detection circuit to detect a magnitude of a ripple in the output voltage; and a ripple attenuation circuit coupled to the output node and a configurable voltage source, wherein the ripple attenuation circuit comprises a second pair of switching devices and a second inductor, and the configurable voltage source is coupled to an input of one of the switching devices of the attenuation circuit, wherein based on the detected magnitude of the ripple, the configurable voltage source is adjusted to generate a ripple attenuation signal by the ripple attenuation circuit at the output node.

2. The apparatus of claim 1, further comprising:
a first capacitor coupling the ripple attenuation circuit to the output node, wherein the configurable voltage source includes an adjustable current source and a second capacitor.

3. The apparatus of claim 1,
wherein the second pair of switching devices are smaller than the first pair of switching devices.

4. The apparatus of claim 1,
wherein a timing of the first pair of switching devices is independent of a timing of the second pair of switching devices.

5. The apparatus of claim 4,
wherein the timing of the second pair of switching devices is based at least in part on a magnitude of the output voltage.

6. The apparatus of claim 4,
wherein the timing of the second pair of switching devices is based at least in part on a rate of change of the output voltage.

7. The apparatus of claim 1, wherein the ripple detection circuit measures current at the first and second inductors to determine a magnitude of the ripple.

8. The apparatus of claim 1, further comprising
one or more additional switching converters coupled to the input voltage, wherein the switching converter and the one or more additional switching converters are configured to operate in multi-phase, wherein at least two switching converters share the ripple attenuation circuit.

9. A method, comprising:
converting an input voltage to an output voltage using a switching convert;
detecting a magnitude of a ripple in the output voltage including:
measuring a first current through a first inductor in the switching converter,
measuring a second current through a second inductor in the ripple attenuating circuit, and
calculating the sum of the first and second currents;
based on the detected magnitude of the ripple, adjusting a configurable voltage source to generate a ripple attenuating signal using a ripple attenuation circuit; and
adding the ripple attenuating signal to the output voltage.

10. The method of claim 9,
wherein adjusting the configurable voltage source includes adjusting a current source and wherein adding the ripple attenuating signal to the output voltage is performed through a capacitor.

11. The method of claim 9, further comprising
calculating a rate of change of the sum of the first and second currents;
multiplying the rate of change and a pulse width modulation signal.

12. The method of claim 11, wherein the pulse width modulation signal controls the timing of the switching converter.

13. The method of claim 9, further comprising
adjusting a timing of a pair of switching devices in the ripple attenuating circuit.

14. The method of claim 13, wherein the timing is adjusted based on a magnitude and/or rate of change of the output voltage.

15. The method of claim 13, wherein the timing of the pair of switching devices in the ripple attenuating circuit is unsynchronized with a timing of a pair of switching devices in the switching converter.

16. The method of claim 9, further comprising
converting the input voltage using a second switching converter; and
combining an output of the second switching converter with the output voltage and the ripple attenuating signal from the ripple attenuating circuit.

17. A ripple attenuation circuit, comprising:
a ripple detector to detect a magnitude of a ripple in an output voltage generated at an output node of a switching converter, wherein the ripple detector is configured to:
measure a current through a first inductor,
measure a second current through a second inductor in the switching converter,
sum the currents through the first and second inductors, and
calculate a rate of change of the sum;
a configurable voltage source;
a first switching device coupled to the configurable voltage source and the output node via the first inductor; and
a second switching device coupled to the output node via the first inductor;
wherein based on the detected magnitude of the ripple, the configurable voltage source is adjusted to generate a ripple attenuating signal at the output node.

18. The circuit of claim 17, further comprising:
a first capacitor coupling first switching device to the output node,
wherein the configurable voltage source includes an adjustable current source and a second capacitor.

19. The circuit of claim 17, further comprising:
a control circuit to control a timing of the first and second switching devices, wherein the timing of the first and second switching devices is unsynchronized with a timing of the switching converter.

20. The circuit of claim 19, wherein the timing of the first and second switching devices is based at least in part on a magnitude and/or rate of change of the output voltage.

21. The circuit of claim 17, wherein the output node is coupled to a second switching converter.

* * * * *